June 28, 1966        J. S. ZUCKERBRAUN        3,258,599
PHOTOSENSITIVE STRAPPED-DOWN NULLING TRACKER
Filed March 12, 1963
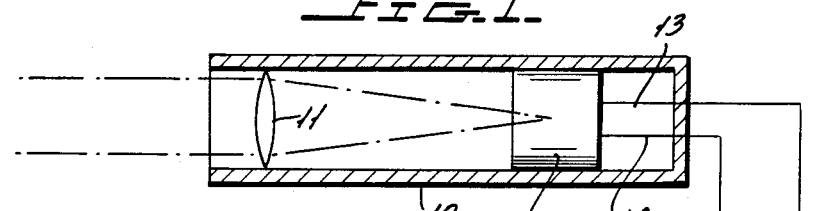
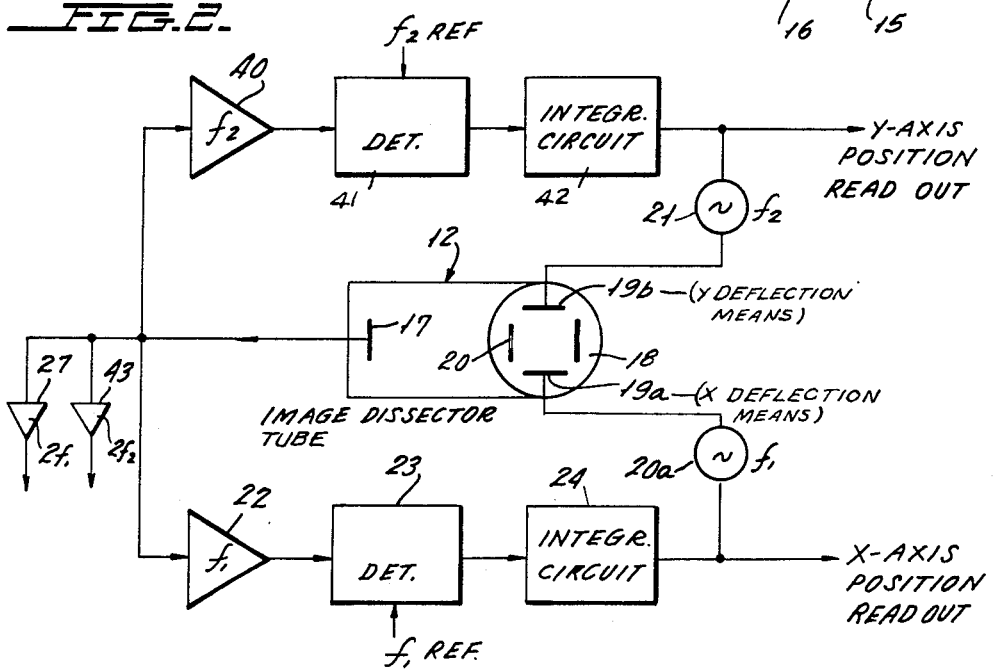
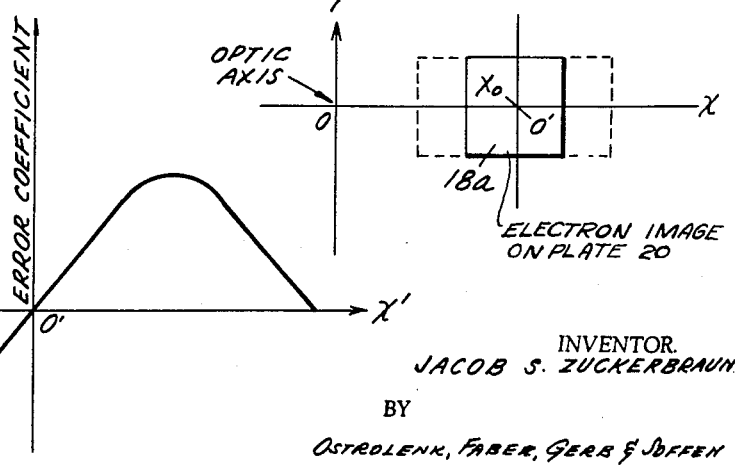
INVENTOR.
JACOB S. ZUCKERBRAUN
BY
OSTROLENK, FABER, GERB & SOFFEN
ATTORNEYS 3,258,599
PHOTOSENSITIVE STRAPPED-DOWN
NULLING TRACKER
Jacob S. Zuckerbraun, New York, N.Y., assignor to Kollsman Instrument Corporation, Elmhurst, N.Y., a corporation of New York
Filed Mar. 12, 1963, Ser. No. 264,576
2 Claims. (Cl. 250—203)

My invention relates to star trackers or similar light source tracking devices, and more specifically relates to a nulling star tracker which does not require gimbals or angle transducers.

Star trackers are well known to the art, and are typically shown in my copending application Serial No. 47,837 filed August 5, 1960, entitled, Light Modulation System, and assigned to the assignee of the present invention.

Star trackers generally require some type of scanning mechanism for modulating the image produced by a telescope system. These scanning mechanisms are mechanical in nature and comprise either rotating shutters or oscillating plates having apertures therein. Moreover, the telescope itself is supported by a gimbal arrangement so that the telescope can be continuously pointed toward the object being tracked.

In accordance with the present invention, the tracking telescope can be strapped directly to the equipment on which it is mounted by virtue of an exceptionally wide field of view for the tracking system. Moreover, the scanning mechanism is completely electronic in nature so that it is unnecessary to provide mechanical oscillation means for the scanning, or mechanical means for moving the telescope.

The principle of the invention is to utilize an image dissector-type of tube in the focal plane of the telescope optics with the electron image of the image dissector cathode being electronically caused to oscillate to provide the required scanning effect with the center of the oscillating electron image being electronically moved by the output signal to null on the star, thus eliminating the need to mechanically move the telescope.

Accordingly, a primary object of this invention is to provide a novel nulling star tracker.

Another object of this invention is to provide a novel star tracker which does not require gimbals.

A further object of this invention is to provide a novel star tracker which does not require angle transducers.

A still further object of this invention is to electronically serve the effective scanning aperture of an image dissector until it nulls on a light source to be tracked.

These and other objects of my novel invention will become apparent from the following description when taken in connection with the drawings, in which:

FIGURE 1 schematically illustrates the complete system of the invention.

FIGURE 2 schematically illustrates the essential elements of the strapped-down dissector tracker.

FIGURE 3 schematically illustrates the effective oscillating aperture obtained by adjustment of the effective photo-sensitive area of the image dissector tube when driven on a single axis.

FIGURE 4 illustrates the fundamental frequency amplitude of a signal generated by the image dissector as a function of displacement of the star image from the center of the aperture travel.

Referring first to FIGURE 1, I have schematically illustrated therein a telescope housing 10 in cross-section which contains therein an appropriate objective system 11 which focuses light upon the photosensitive surface of a suitable image dissector-type tube 12. Included with the dissector 12 are other electronic equipment required for the operation of the image dissector which is well known to those skilled in the art.

Two output lines 13 and 14 will, as described more fully hereinafter, contain information to y axis position and x axis position respectively, with these signals applied to appropriate read-out circuitry, or processing circuitry 15 and 16, which can perform any desired function such as a repositioning of the vehicle carrying the star tracker, direct indication of the measured position, or the like.

The image dissector tube 12 is schematically illustrated in FIGURE 2 as having an anode 17, a large area photosensitive cathode surface 18, deflection means schematically illustrated by x deflection plate 19a and y deflection plate 19b, and a plate 20 which has a centrally disposed aperture therein. The front surface of cathode 18 is a large continuous photosensitive surface upon which the optical image formed by objective 11 (FIG. 1) is focused. An electron beam issues from the other surface of cathode 18 toward anode 17 from the portion of cathode 18 which receives radiation. This electron beam is controlled in direction by the deflection means 19a and 19b which could be electrostatic or magnetic positioning means.

For purposes of the star tracking application, it is convenient to think of cathode 18 as a small sensitive area which is positioned electronically by the electric or magnetic control fields. In actuality, the optical image focused on the front surface of cathode 18 is transferred into an electronic image which is then transferred to aperture plate 20 within tube 12. Only that part of the electron image which falls within the opening in plate 20 passes through to anode 17 to be amplified. If a deflecting field is applied to the electron image, the image will shift with respect to plate 20. Therefore, in effect, the cathode appears to be a small area the size of the aperture in plate 20 which, assuming unity electron image magnification, is moved about by the deflecting field.

Thus, by applying a sinusoidal voltage to x deflection plate 19a, an electron image portion from a small photosensitive region in cathode 18 will effectively oscillate across the surface of the cathode with the frequency of the applied signal. Similarly, this electron image portion can be caused to oscillate in a direction perpendicular to the above direction by connection of appropriate sinusoidal voltages to other deflecting plate 19b. If desired, simultaneous application of control signals to plates 19a and 19b will cause the electron image on the surface of plate 20 to effectively execute a Lissajous pattern.

The deflection system corresponding to plate 19a of FIGURE 2 is connected to a source of A.-C. voltage 20a which has a frequency $f_1$ which could, for example, be 1,000 cycles per second. In a similar manner, the deflection system corresponding to plate 19b is connected to a source of A.-C. voltage 21 which has a frequency $f_2$, which is different from $f_1$ and could, for example, be 1,300 cycles per second.

Assuming, for purposes of simplicity, that only the x axis scanning frequency source 20a is active, then, as illustrated in FIGURE 3, the electron image falling on plate 20, shown in solid lines, will, in effect, oscillate from left to right, as illustrated by the dotted line positions. The excursion of the oscillation is determined by the magnitude of the deflecting voltage.

The output from the image dissector anode 17 is then applied to an appropriate filter which passes frequency $f_1$ to amplifier 22, and then through a suitable detector 23, an integrating circuit or low-pass filter 24, and then to an x axis position read-out means, as illustrated in FIGURE 1, as read-out means 15. Clearly, the D.-C. deflection potential of circuit 24, superimposed on source $20a$, tends to move the center of oscillation of the electron image from the center $x_0$ or $O'$ in FIGURE 3 to the optical axis $O$ in FIGURE 3, thereby to serve as a nulling potential.

The output of anode 17 is further connected to amplifier 27 which is tuned to receive signals of frequency $f_2$ which indicates the existence of a null for null recognition purposes. This then permits the telescope to be strapped down and avoids a gimbal support and position control servo mechanism therefor.

It will be noted that the operation given above has been for $x$ axis operation only. At the same time, however, $y$ axis scanning could be taking place at the frequency $f_2$ with the elemental photosensitive surface of the cathode in effect executing a Lissajous pattern with both $x$ and $y$-axis nulling occurring simultaneously. That is to say, a $y$ axis operating system identical to the $x$ axis system is provided which includes an appropriate filter and amplifier 40 for the frequency $f_2$, an appropriate detector 41 and integrating circuit 42 and null recognition signal amplifier 43 which receives signals having the frequency $2f_2$ which indicates a $y$ tracking null. The operation of the $y$ axis system is, of course, identical to that of the $x$ axis system described above.

The outputs of integrators 24 and 42, in addition to supplying deflection potentials, also represent analog voltages that are linearly related to the star position with respect to the optical axis of the telescope (FIGURE 1), and can be directly presented in appropriate indicating equipment or correction equipment.

Moreover, search voltages can be inserted in series with the integrator outputs to extend the field of view of the telescope to still larger angles of view. Thus, as shown in FIGURE 3, the initial position $X_0$ of the center of oscillation is established by means of a search potential so that the star was acquired within the oscillating field. Once the star is acquired, the correction signals will be generated as explained above.

Although I have described preferred embodiments of my novel invention, it will now be understood that many variations and modifications will be obvious to those skilled in the art, and I prefer therefore that the scope of this invention be limited not by the specific disclosure herein, but only by the appended claims.

I claim:
1. A light source tracker comprising telescope means for producing an object of a light source to be tracked, an image dissector means having a cathode in the focal plane of said telescope means, an anode spaced from said cathode, a plate having an aperture therein disposed between said anode and said cathode, and control circuit means for controlling the path of an electron beam emitted from said cathode; said cathode being characterized in directing an electron beam toward said anode from an area thereof exposed to the image of said light source; and a sinusoidal voltage source of predetermined frequency connected to said control circuit means for causing said electron beam to oscillate across said aperture; a demodulator means connected to said anode to demodulate the output voltage of said anode thereby to convert the output fundamental frequency of said anode to a D.-C. voltage having a polarity dependent upon the sense of the deviation of the center of oscillation of said electron beam from the center of said aperture, and integrator means connected between said demodulator means and said control circuit means for applying a nulling potential thereto to move the center of oscillation of said electron beam to the center of said aperture.

2. The device substantially as set forth in claim 1 wherein said electron beam is oscillated to execute a Lissajous pattern.

References Cited by the Examiner
UNITED STATES PATENTS

| | | | |
|---|---|---|---|
| 2,892,949 | 6/1959 | Hardy | 250—215 |
| 2,954,608 | 10/1960 | Lawlor | 250—203 X |
| 2,965,762 | 12/1960 | Turck | 250—203 |
| 2,967,247 | 1/1961 | Turck | 250—203 |
| 3,039,002 | 6/1962 | Guerth | 88—1 X |
| 3,161,725 | 12/1964 | Hotham | 178—7.2 |

RALPH G. NILSON, *Primary Examiner.*

WALTER STOLWEIN, CHESTER L. JUSTUS,
*Examiners.*

M. R. WILBUR, *Assistant Examiner.*